Nov. 1, 1932.  E. W. BUSKETT  1,885,412
PROCESS OF AND APPARATUS FOR TREATING METALLIC ORES
Filed June 20, 1928
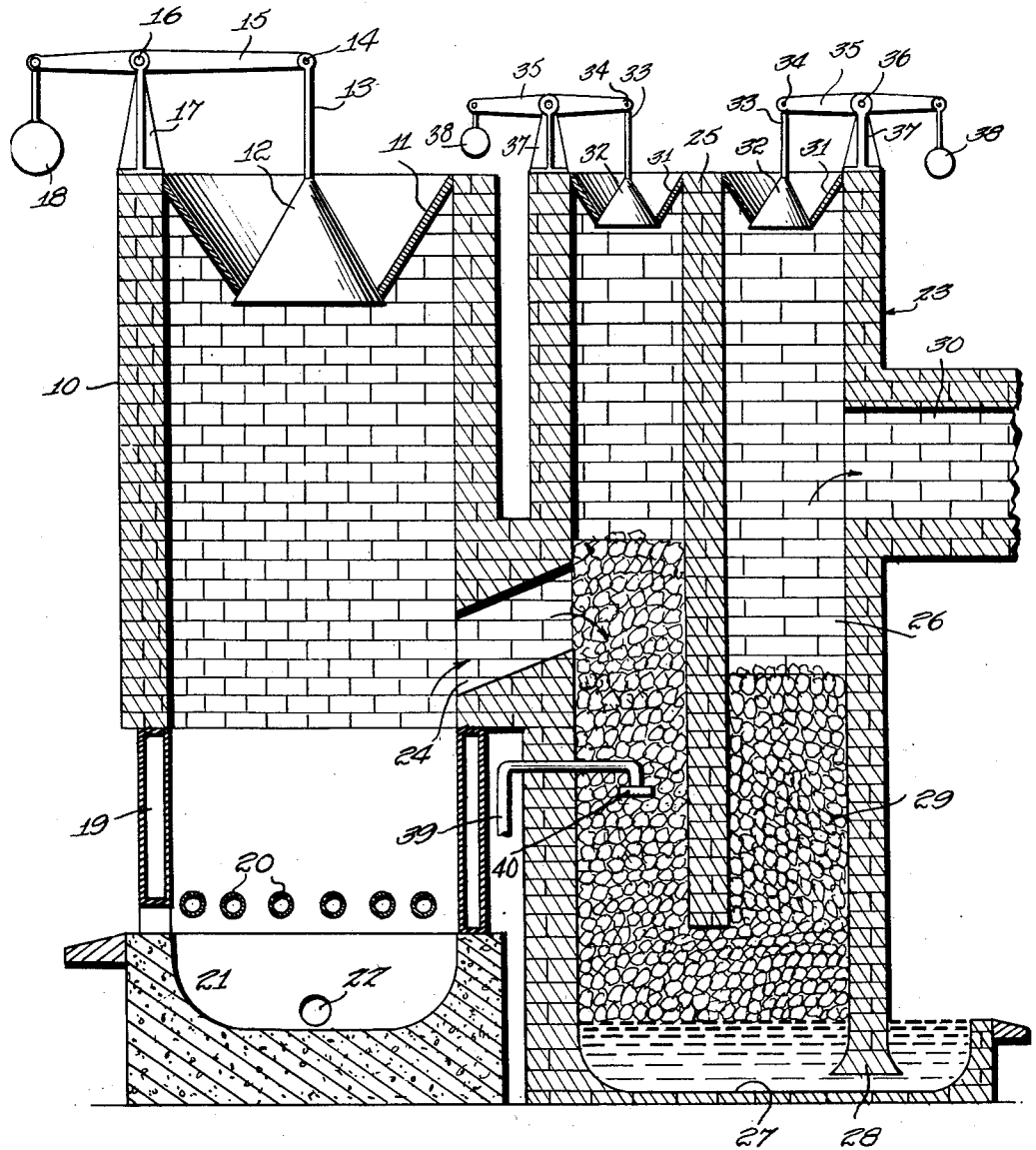
Inventor
EVANS W. BUSKETT
By G.W. Earnshaw
Attorney Patented Nov. 1, 1932

1,885,412

UNITED STATES PATENT OFFICE

EVANS W. BUSKETT, OF JOPLIN, MISSOURI

PROCESS OF AND APPARATUS FOR TREATING METALLIC ORES

Application filed June 20, 1928. Serial No. 286,789.

This invention relates to a process of and apparatus for treating ores containing relatively volatile metals, and particularly zinc ores.

The ores of iron, copper and lead usually are smelted in a blast furnace, and copper and lead ores often contain zinc, the major portion of which is volatilized and oxidized, and thus passes out of the furnace and is lost.

Numerous attempts have been made to smelt zinc ores in a blast furnace and to recover the zinc in metallic form, but up to the present time, the attempted processes have failed, largely because of the fact that the zinc passes through the means used for condensing the vapors thereof in the form of zinc oxid, the reduction of which is prevented because of the presence of carbon dioxid. The zinc usually collected in such processes is in the form of blue powder which contains ninety per cent. zinc due to the dilution of the zinc vapors by an excess of nitrogen, carbon dioxid and sulphur dioxid gases.

An important object of the present invention is to provide a novel process and apparatus for effecting the reduction of zinc ores to permit the ready recovery of zinc in metallic form.

A further object is to provide for the utilization of a blast furnace for the reduction of the ore by carrying out the condensation step of the process with the exclusion of air, thus minimizing the formation of oxids.

A further object is to provide a process and apparatus of the character referred to wherein carbon or carbonaceous vapors are employed as the reducing mediums, the carbon or carbonaceous vapors being in a heated state whereby the zinc oxids formed are readily reduced to form molten zinc and carbon monoxide.

A further object is to provide a process of the character referred to wherein the ores are reduced and the resultant vapors of reduction are passed immediately into the presence of the reducing medium referred to, whereby the formation of zinc oxids prior to the condensation step is minimized.

A further object is to provide as an additional step in the method, the introduction of a gaseous reducing medium into the reducing material to assist in reducing the vaporized zinc and thus minimize the loss thereof.

A further object is to provide as an added step in the method the introduction of steam adapted to be decomposed in the condensing medium to form carbon monoxide and hydrogen to intensify the reducing action and to minimize the losses of zinc vapors if the latter should be fed too rapidly through the condensing medium.

A further object is to provide a novel form of apparatus for effecting the reduction of zinc ores in accordance with the present process, whereby substantially pure metallic zinc may be obtained.

A further object is to provide an apparatus of the character referred to wherein the zinc ores are submitted to reduction in a blast furnace and wherein the zinc vapors are immediately passed into contact with novel condensing means whereby the condensation of vapors into liquid form takes place substantially out of contact with oxygen.

A further object is to provide an apparatus of the character referred to wherein the condensing medium employed is adapted to minimize the formation of and to reduce carbon dioxid to prevent to a great extent the formation of zinc oxid and at the same time to effect the reduction of any zinc oxid which is formed whereby zinc in metallic form may be collected.

A further object is to provide a zinc reducing apparatus having means for excluding air therefrom.

A further object is to provide means for introducing into the condensing medium a gaseous or similar source of carbon monoxid to assist in the reducing action which takes place in the condensing medium.

Other objects and advantages of the invention will become apparent during the course of the following description.

In the practice of the process, ore containing metals such as zinc volatile at a relatively low temperature, fuel and fluxes are charged in a reducing furnace such as a blast furnace. The fuel employed provides the heat and reducing agent for effecting the reduction of the ore, and the metallic constituents of the ore in the form of vapor are immediately passed through a condensing chamber preferably containing a body of a carbonaceous material such as carbon, coke or the like. The smelting of the ore and passage of the metallic vapor through the carbonaceous medium takes place substantially without the presence of oxygen. The body of carbonaceous material is maintained at a relatively high temperature, and at the point where the vapors are introduced therein, the temperature of the carbonaceous medium is above the vaporizing point of the metal sought to be collected. Thus, the desired high temperature of the vapors is maintained as the latter pass into the carbonaceous medium. The heat in the blast furnace is maintained sufficiently high to enable the vapors passing therefrom to maintain the decided temperature in the condensing chamber.

The zinc or other vaporized metal passes into the body of carbon largely in metallic form, some metallic oxid being present which ordinarily is difficult to reduce owing to the presence of carbon dioxid, as previously stated. In the present method, however, the carbon dioxid passing from the reducing furnace comes into contact with the heated carbon, and thus is broken down, to form carbon monoxid. This gas, having a high affinity for oxygen, readily reduces the zinc oxid present and the carbon thereupon acts as a further reducing medium to reduce the zinc oxide to metallic zinc vapors whereby the latter can be condensed and the metal recovered from beneath the carbonaceous material. The residual vapors and gases pass from the carbonaceous body, together with whatever very slight percentage of metal vapor fails to condense Ordinarily the loss of the metallic vapor in the manner referred to is negligible, but may be quite considerable if the passage of the vapors through the carbonaceous body takes place too rapidly. Under such conditions, the process involves, as an additional step, the provision of an excess of carbon monoxid in the body of carbonaceous material. This preferably is accomplished by introducing steam into the body of carbon, the steam being decomposed under the influence of the heat present to form hydrogen and oxygen, while the latter element, with the carbon present, forms carbon monoxid gas. This excess of carbon monoxid thus created increases the intensity of reduction of the metallic vapor and thus compensates for any abnormally rapid movement of the gases and vapors through the carbonaceous material. The use of hydrogen as a reducing agent is well known and it will be apparent that this gas, present in this instance due to the introduction of steam, will have a pronounced effect in reducing oxides to metal vapors.

In the drawing I have shown one embodiment of an apparatus adapted for use in practicing the process, the single figure being a central vertical sectional view. Referring to the drawing, the numeral 10 designates a blast furnace having a conical feed hopper 11 at its upper end, normally closed by a valve 12. This valve is connected to a stem 13 which is pivotally connected at its upper end as at 14 to a lever 15. Intermediate its ends, the lever is pivotally supported as at 16 by a bracket 17, and a weight 18 is connected to the outer end of the lever to normally maintain the valve in closed position.

The lower portion of the furnace may be water jacketed as at 19, the water jacket preferably being formed in sections and provided with tuyères or openings 20 for the introduction of an air blast into the furnace. A well 21 may be formed in the base of the furnace and provided with an outlet opening 22. This well is adapted for the collection of lead when the apparatus is used for the reduction of ores such as zinc ore containing a substantial percentage of lead.

One or more condensers indicated as a whole by the numeral 23 is arrange adjacent the furnace and communicates therewith through one or more throats 24 located in the smelting zone for driving off vapors laterally immediately upon formation of same. The condenser is divided by a central wall 25 to form a substantially U-shaped conduit 26, the bottom of the wall 25 terminating a substantial distance above the bottom of the condenser, as shown. A collecting basin 27 is formed in the bottom of the condenser, and the outer wall of the latter extends downwardly into the basin as at 28 to form an air seal. The zinc or other metal recovered with the present apparatus may be siphoned from the outer portion of the basin 27, as will be apparent.

A body of carbonaceous material 29 is arranged in the condenser, this material being in any desired form such as coke or carbon. The portion of the carbonaceous material in the leg of the conduit 26 adjacent the furnace preferably extends upwardly at least to the top of the throat 24. After the vapors and gases have passed through the body of carbonaceous material, they are discharged from the condenser through an outlet flue 30 which is connected to a fan and continuously pulling vapors through the condenser and for carrying away the remaining gases and vapors after the metal has been recovered therefrom.

Each leg of the conduit 26 is adapted to be supplied with carbonaceous material through a hopper 31 normally closed by a preferably conical valve 32 connected to a stem 33. This stem is pivotally connected at its upper end as at 34 to a lever 35. The lever is pivotally supported intermediate its ends as at 36 by a bracket 37, and a weight 38 is connected to the outer end of the lever 35 to normally maintain the valve in closed position and thus exclude air from the condenser.

As previously stated, it is desirable under some conditions to supply steam to the condenser to generate hydrogen and carbon monoxide, and for this purpose, a pipe 39 extends through one wall of the condenser as shown in the drawing. A spray head 40 may be carried by the inner end of the pipe 39, and the latter is connected to a suitable source of steam.

The operation of the apparatus is as follows:

The ore, fuel and fluxes are charged into the blast furnace, the fuel providing the heat and also a reducing agent for the reducing action, as will be apparent. It may be considered that three separate zones are provided within the furnace, the top zone extending upwardly from the top of the throat 24 to the top of the material within the furnace, the central zone extending from the top of the throat 24 downwardly to the tuyères 20, and the bottom zone lying between the tuyères and the well 21. In the action of the apparatus, substantially all of the reduction of the ore takes place in the central zone, there being practically no chemical reaction in the top zone. The bottom zone is for the reception of slag or other material from which any small lead content may be recovered in a fore hearth. The well 21 is employed only if the ore contains a material percentage of lead, in which case the molten lead will collect from the matte and slag and may be removed through the siphon tap 22 in the usual manner.

The zinc vapors pass into the condenser through the throat 24 and downwardly into the body of carbonaceous material 29 which constitutes a combination condensing and reducing body. The zinc vapors pass into the carbonaceous material largely in substantially pure form, some of the zinc however, being in the form of zinc oxid. As previously stated, the products of combustion and other materials from the blast furnace maintain the body of carbonaceous material at an elevated temperature, the temperature of the material adjacent the throat 24 being sufficiently high to reduce the zinc oxid. The oxygen of this compound combines with the surface material of the carbon to form carbon monoxid, and thus the zinc oxid is reduced and is condensed in liquid form to collect in the basin 27 together with the pure zinc vapors which, of course, are not subjected to any reducing action in the carbonaceous material but are merely condensed therein.

The carbon monoxid formed in the reducing action referred to obviously has a strong affinity for oxygen and accordingly assists in the reducing action by breaking down some of the zinc oxid. The carbon dioxid in the products of combustion passing from the blast furnace is reduced to carbon monoxid upon contact with the carbonaceous material, thus affording a second source of this gas to assist in the reduction of the zinc oxid present in the vapors. The molten zinc collected in the basin 27 in the manner referred to may be drawn off in any desired manner, as will be apparent.

The outer leg of the U-shaped conduit 26 is provided with a considerable quantity of the carbonaceous material to prevent the escape of zinc vapor from the flue 30 when the passage of gases through the condenser takes place too rapidly to permit the reduction of the zinc oxid and the condensation of the zinc vapor. Ordinarily, therefore the steps of the process are completely carried out before the residual gases reach the flue 30, and these gases may be taken from the flue to the bag house or any other suitable collector. Should the amount of metallic vapor and metallic oxid escaping reduction and condensation be considered excessive, steam may be introduced into the condenser through the pipe 39. This steam, acting with the hot carbonaceous material, is decomposed to form hydrogen and carbon monoxid gases, the latter therefore forming a third source of carbon monoxid gas to insure the completion of the process with the loss of negligible quantities of the metal through the flue 30.

As previously stated, it is desirable to exclude oxygen from the condenser, and accordingly the valves 32 are provided to seal the condenser from the atmosphere. These valves readily may be opened when it is desired to introduce fresh charges of carbon into the condenser. Similarly, the valve 32 prevents the introduction of air into the condenser through the top of the blast furnace due to the stack effect or the draft effect created by the fan associated with the flue 30. The only air provided is that which is fed through the tuyères, and this air passes through the central or active zone of the blast furnace to continue the proper combustion of the fuel therein.

While I have described in detail the preferred practice of my invention it is to be understood that the form of apparatus shown and described and the details of procedure may be varied without departing from the spirit of the invention or the scope of the subjoined claims.

I claim:

1. The process of reducing ore of metals volatile at relatively low temperatures which comprises heating the ore in a blast furnace in the presence of a reducing agent to form metal vapor of the relatively volatile metal having a relatively small oxide content, withdrawing the vapor thus formed from the furnace, immediately passing the vapor into a condensing chamber having a downward heat gradient, providing sufficient suction to promote withdrawal of vapor from the furnace and draw vapors through the condensing chamber, and introducing a reducing agent into said chamber to assist in reducing the oxide constituent of said vapor.

2. The process of reducing ore of volatile metals which comprises heating a body of ore containing zinc in a furnace in the presence of a reducing agent to transform the zinc into metallic vapor having a relatively small oxide content, withdrawing the vapor thus formed from the furnace, immediately passing the vapor into a condensing chamber containing a body of heated carbonaceous material, and introducing steam into said chamber to generate carbon monoxide and hydrogen.

3. In a process of treating ore containing metal volatile at relatively low temperatures which includes vaporizing in a blast furnace the relatively volatile metal content of the ores to produce vapors of said metal including oxides of the metal, the steps of withdrawing the vapors from the furnace, passing the vapors downwardly through a condensing chamber, maintaining the vapors at a temperature above the reduction temperature of the oxides at the upper end of the path of the vapors through the chamber, reducing said oxides during travel through said chamber to free the metal vapors from oxygen, lowering the temperature of the metal vapors to effect liquefaction of the metal, providing sufficient suction to effect said withdrawal of vapors from the furnace and promote movement of vapors through the chamber, and drawing off the liquid metal from the lower end of the path of vapors.

4. In a process of treating ores containing a metal volatile at a relatively low temperature which includes vaporizing in a blast furnace the relatively volatile metal content of the ores to produce vapors of said relatively volatile metal content including oxides of the metal, the steps of withdrawing said vapors from the furnace, passing the vapors downwardly into a condensing chamber, maintaining the vapors at a temperature above the reduction temperature of the oxides at the upper end of the path of vapors through the chamber, reducing said oxides during travel thereof through said chamber to free the metal from oxygen, lowering the temperature of the metallic vapors to the melting point of the metal at the lower end of said path to effect liquefaction of said metal, drawing off the liquid metal from said lower end of the path vapors, and conducting the waste gases upwardly from the chamber.

5. The process of treating ores containing metals volatile at relatively low temperatures including zinc which comprises heating the ores in the presence of a reducing agent in a blast furnace, controlling the heat effect to form vapors of said relatively volatile constituents of the ores including oxides heated to a temperature above the reduction temperature of the oxides in the vapors, drawing off said vapors continuously from the furnace at the reduction zone thereof to maintain the same at a temperature above the reduction temperature of said oxides, passing the vapors from the reduction zone of the furnace downwardly in a vertical path in a condensing zone at a rate sufficient to hold the vapors substantially at said maintained temperature, contacting said oxides with a reducing agent in the condensing zone, and artificially setting up a draft for controlling movement of vapors through the condensing zone.

6. The process of reducing ores containing a metal volatile at a relatively low temperature including heating ore in a blast furnace in the presence of a reducing agent to reduce and vaporize the relatively volatile metal, drawing all the vapors and products of combustion from the reduction zone of the furnace downwardly through reducing material in a condensing zone, and drawing off all uncondensed vapors from the condensing zone.

7. The process of reducing ores including heating a body of ore containing a metal volatile at a relatively low temperature in a furnace in the presence of a reducing agent to reduce and vaporize said metal, passing the metal vapors from the furnace downwardly, laterally and upwardly through reducing material in a condensing chamber, and setting up suction for drawing off gaseous products of combustion from the condensing chamber.

8. The process of reducing ores of easily vaporizable metals including zinc including heating ore mixed with fuel by combustion of the fuel in a blast furnace to reduce and vaporize said easily vaporizable metal, passing all vapors from the furnace downwardly a substantial distance through a condensing chamber in the presence of an auxiliary reducing agent, maintaining a blast of air through said body of fuel and ore to support combustion, and exhausting all uncondensed vapors from the condensing chamber.

9. The process of treating metallic ores including heating a body of zinc ore mixed with fuel in a furnace in the presence of a reducing agent, passing vapors including zinc oxides from the furnace downwardly into a condensing chamber at a temperature above the reduction temperature of the oxides, conducting the vapors including products of combustion downwardly a substantial vertical distance through carbonaceous material in the condensing chamber and then upwardly through carbonaceous material to a chamber outlet, and maintaining suction at said outlet sufficient to promote movement of vapors downwardly and upwardly through the condensing chamber at a rate for promoting reduction of zinc oxides and condensation of zinc vapors.

10. The process of treating metallic ores containing zinc including heating a body of ore mixed with fuel in a furnace in the presence of a reducing agent, passing vapors including oxides of the metal from the furnace downwardly into a condensing chamber at a temperature above the reduction temperature of the oxides, conducting the vapors including products of combustion, vertically downwardly through carbonaceous material in the condensing chamber a sufficient distance to effect reduction of temperature of the vapors to approximately the melting point of the metal for effecting condensation of metal vapors, conducting uncondensed vapors upwardly through carbonaceous material to a chamber outlet, maintaining suction at said outlet sufficient to promote movement of vapors downwardly and upwardly through the condensing chamber at a rate conducive to reduction of metal oxides and condensation of metal vapors, and delivering a fluid to said chamber to react with the carbonaceous material for producing a supplementary agent to promote reduction of oxides.

11. The process of treating metallic ores consisting of heating a body of zinc ore mixed with fuel in a blast furnace in the presence of a reducing agent, passing all vapors produced in the furnace including oxides of zinc directly from the reduction zone of the furnace in an upward gradient into a condensing chamber at a temperature above the reduction temperature of the oxides, conducting the vapors including products of combustion in a vertical path downwardly and then laterally through carbonaceous material in the condensing chamber a sufficient distance to effect reduction of temperature of the vapors to approximately the melting point of zinc for effecting condensation of zinc vapors, collecting liquid zinc below said material, conducting uncondensed vapors upwardly through carbonaceous material to the outlet of the chamber, maintaining sufficient suction at said outlet to draw uncondensed vapors from the chamber through said outlet and promote movement of vapors downwardly in the chamber through said material for controlling the heat gradient in said vertical path of vapors, and discharging steam into the stream of vapors moving over said vertical path downwardly in the condenser.

12. The process of treating metallic ores including heating a body of ore containing easily vaporizable metals including zinc in a blast furnace in the presence of a reducing agent to reduce metallic oxides and vaporize the easily vaporizable metals, drawing off all of the vapors from the blast furnace including metal oxides at a temperature above the reduction temperature of said oxides, passing said vapors downwardly and then upwardly through a condensing zone, and delivering a fluid containing hydrogen to the vapors while said vapors are passing through the condensing zone to provide a reducing agent.

13. The process of treating metallic ores including heating a body of ore containing a metal volatile at a relatively low temperature in a blast furnace in the presence of a reducing agent to vaporize said metal, drawing off vapors including metallic oxides and products of combustion from the furnace at a temperature above the reduction temperature of said oxides, passing the vapors downwardly into a condensing zone containing reducing material, delivering a fluid containing a reducing agent to the condensing zone to provide a secondary agent to reduce oxides in said vapors, drawing off uncondensed vapors from the condensing zone, and drawing off liquid metal from the condensing zone.

14. The process of treating ores which consists in heating a body of ore in the presence of a reducing agent to vaporize the metal contained therein, passing said vapor downwardly in a condensing zone and intermingling therewith a vehicle carrying a reducing agent and partially condensing said vapors, passing said vapors and condensate downwardly through a porous heated bed of carbonaceous material, collecting condensed metal below said bed, passing the uncondensed vapors upwardly through a heated bed of carbonaceous material in a second condensing zone for further condensing said vapors, collecting said condensed metal below said bed and lastly drawing off uncondensable vapors from said condensing zone.

15. The process of treating ores containing a metal volatile at relatively low temperatures which consists in heating a body of ore in the presence of a reducing agent to vaporize the metal in said ore, passing said vapor into a condenser, intermingling said vapor with a fluid containing a reducing agent for partially condensing and reducing said metallic vapor, passing said condensate and remaining vapors downwardly through a porous bed of a carbonaceous material heated to a temperature below the volatilization point of the metal being treated for further reducing and condensing the metallic vapors, collecting the condensed metal in a pool below said porous bed, passing the remaining uncondensed vapors upwardly through a porous bed of carbonaceous material heated to a temperature below the volatilization point of the metal for completing the reduction and condensation of the metallic vapors, gathering said condensed vapors in said pool, continuing the upward passage of uncondensed vapors to a point above said last mentioned porous bed, and then removing said uncondensed vapors.

In testimony whereof I affix my signature.

EVANS W. BUSKETT.